US009654400B2

(12) United States Patent
Otomo et al.

(10) Patent No.: US 9,654,400 B2
(45) Date of Patent: May 16, 2017

(54) DATA COMMUNICATION METHOD AND DATA COMMUNICATION SYSTEM

(71) Applicant: FUJITSU LIMITED, Kawasaki-shi, Kanagawa (JP)

(72) Inventors: Toshiya Otomo, Kawasaki (JP); Koichiro Yamashita, Hachioji (JP); Naoki Odate, Akiruno (JP); Takahisa Suzuki, Yokohama (JP); Hiromasa Yamauchi, Usakos (NA); Koji Kurihara, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 133 days.

(21) Appl. No.: 14/096,624

(22) Filed: Dec. 4, 2013

(65) Prior Publication Data

US 2014/0092747 A1   Apr. 3, 2014

Related U.S. Application Data

(63) Continuation of application No. PCT/JP2011/063731, filed on Jun. 15, 2011.

(51) Int. Cl.
 *H04L 12/803* (2013.01)
 *H04W 28/02* (2009.01)
 (Continued)

(52) U.S. Cl.
 CPC .......... *H04L 47/125* (2013.01); *H04L 47/20* (2013.01); *H04W 28/0289* (2013.01); *H04L 47/14* (2013.01); *H04L 47/30* (2013.01)

(58) Field of Classification Search
 CPC ....... H04L 47/125; H04L 47/20; H04L 47/30; H04L 47/14; H04W 28/0289
 (Continued)

(56) References Cited

U.S. PATENT DOCUMENTS

| 7,961,694 B1* | 6/2011 | Chan et al. ............. 370/341 |
| 2003/0161265 A1* | 8/2003 | Cao ............. H04L 12/2697 370/229 |

(Continued)

FOREIGN PATENT DOCUMENTS

| JP | 2000-78146 | 3/2000 |
| JP | 2007-89021 | 4/2007 |

(Continued)

OTHER PUBLICATIONS

Japanese Office Action mailed Jun. 24, 2014 in corresponding Japanese Patent Application No. 2013-520371.
(Continued)

*Primary Examiner* — Obaidul Huq
(74) *Attorney, Agent, or Firm* — Staas & Halsey LLP

(57) ABSTRACT

A data communication method includes determining by a first terminal apparatus that is included among plural terminal apparatuses capable of direct communication with one another, whether a communication volume of data received from a second terminal apparatus that is included among the terminal apparatuses exceeds a processable communication volume; and transmitting by the first terminal apparatus to the second terminal apparatus, a portion of the data of a given communication volume, when the communication volume of the data exceeds the processable communication volume.

9 Claims, 11 Drawing Sheets

(51) Int. Cl.
  *H04L 12/813* (2013.01)
  *H04L 12/801* (2013.01)
  *H04L 12/835* (2013.01)
(58) Field of Classification Search
  USPC ....... 370/229, 235, 236, 298, 300, 310, 312, 370/351, 428, 464, 474, 476
  See application file for complete search history.

(56) References Cited

U.S. PATENT DOCUMENTS

| | | | |
|---|---|---|---|
| 2004/0179476 A1* | 9/2004 | Kim et al. | 370/230 |
| 2009/0034498 A1 | 2/2009 | Banerjea et al. | |
| 2009/0170556 A1 | 7/2009 | Yamasaki et al. | |
| 2010/0061244 A1* | 3/2010 | Meier | H04L 12/2867 370/236 |
| 2011/0151831 A1* | 6/2011 | Pattabiraman | 455/405 |
| 2011/0194440 A1* | 8/2011 | Wang et al. | 370/252 |

FOREIGN PATENT DOCUMENTS

| | | |
|---|---|---|
| JP | 2007-243794 | 9/2007 |
| JP | 2008-124719 | 5/2008 |
| JP | 2009-159467 | 7/2009 |
| JP | 2010-45525 | 2/2010 |
| JP | 2010-183215 | 8/2010 |
| WO | 2009/018361 | 2/2009 |

OTHER PUBLICATIONS

PCT International Preliminary Report on Patentability mailed Jan. 3, 2014 in corresponding International Application No. PCT/JP2011/063731.

International Search Report mailed Jul. 12, 2011 in corresponding International Application No. PCT/JP2011/063731.

\* cited by examiner

DATA COMMUNICATION METHOD AND DATA COMMUNICATION SYSTEM

CROSS REFERENCE TO RELATED APPLICATIONS

This application is a continuation application of International Application PCT/JP2011/063731, filed on Jun. 15, 2011 and designating the U.S., the entire contents of which are incorporated herein by reference.

FIELD

The embodiment discussed herein is related to a data communication method and a data communication system that reduce the communication load on terminals when data communication is performed using multiple terminals.

BACKGROUND

When a large number of terminals such as mobile telephones concentrate in a particular area like at a shrine on New Year's Day or when an event is held at a horse racetrack, terminals that are unable to perform communication arise. The number of terminals that can connect to a single base station is limited and when a large number of terminals become subjected to a congested state such as those described, even if the terminals are within an area enabling communication, some terminals are unable to perform communication.

In addition to architecture in which such terminals directly communicate with the base station, techniques that autonomously build communication paths between terminals without passing through a base station have been disclosed. These techniques involve ad hoc communication in which a terminal that cannot directly communicate with the base station performs ad hoc communication with nearby terminals to thereby communicate with the base station via a management terminal that is connected to the base station (see, for example, Japanese Laid-Open Patent Publication No. 2007-89021).

Further, another technique is present in which multiple terminals search for surrounding terminals and based on a given selection criteria, determine terminals as a leader candidate, whereby autonomous grouping in the ad hoc network is performed (see, for example, Japanese Laid-Open Patent Publication No. 2010-45525). According to another technique, when an ad hoc network is built by radio sensors, the base station determines based on a radio sensor list and signal strength, a radio sensor that is to be a parent node and performs grouping for each parent node (see, for example, Japanese Laid-Open Patent Publication No. 2007-243794). Another technique involves a radio sensor network in which various types of radio units are disposed respectively in terminals and at access points to perform communication that is favorable in terms of interference properties, irrespective of the communication environment (see, for example, Japanese Laid-Open Patent Publication No. 2010-183215).

Nonetheless, terminals that cannot directly communicate with the base station communicate with the base station by ad hoc communication. As a result, communicated packets have to pass through a terminal that is directly communicating with the base station, whereby the bulk of communication concentrates at the terminal, increasing the communication load on the terminal. In addition, terminals such as mobile telephones have limited resources, such as power supply and space, and are powerless unlike terminals equipped on vehicles.

With the techniques disclosed in Japanese Laid-Open Patent Publication Nos. 2007-89021, 2010-45525, 2007-243794, and 2010-183215, the ad hoc communication does not consider cases where a large number of terminals concentrate in a particular area. Consequently, the ad hoc communication is performed and when a large number of terminals concentrate in a particular area, the communication load concentrates at a single terminal that is directly communicating with the base station, whereby the terminal fails, unable to tolerate the concentrated communication load.

For example, at the terminal directly communicating with the base station, a radio signal received by a communication module is converted into digital data (packets); the packets are stored to a communication buffer in the memory by the CPU; and thereafter, a communication processing unit analyzes the packets and processes the data in the packets according to the header information. Thus, although the communication packets are processed after accumulating in the buffer, if the rate at which packets are received surpasses the rate at which the packets are processed, the buffer overflows.

For example, packets are assumed to be received at 100 Mbps from another ad hoc communication terminal and the packets are assumed to be transmitted at 20 Mbps to the base station. If the capacity of the communication buffer is 10 Mbytes, the communication buffer overflows in merely 1 second. If the communication buffer overflows, packet loss occurs and the throughput of the network overall drastically drops consequent to retransmission of the packets.

In ad hoc communication, multiple terminals are connected and respectively have communication buffers, the majority of which have sufficient available capacity. However, as described above, a problem arises in that the overflow of the buffer of a single terminal invites drops in the performance of the network overall.

SUMMARY

According to an aspect of an embodiment, a data communication method includes determining by a first terminal apparatus that is included among plural terminal apparatuses capable of direct communication with one another, whether a communication volume of data received from a second terminal apparatus that is included among the terminal apparatuses exceeds a processable communication volume; and transmitting by the first terminal apparatus to the second terminal apparatus, a portion of the data of a given communication volume, when the communication volume of the data exceeds the processable communication volume.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Figure 1:
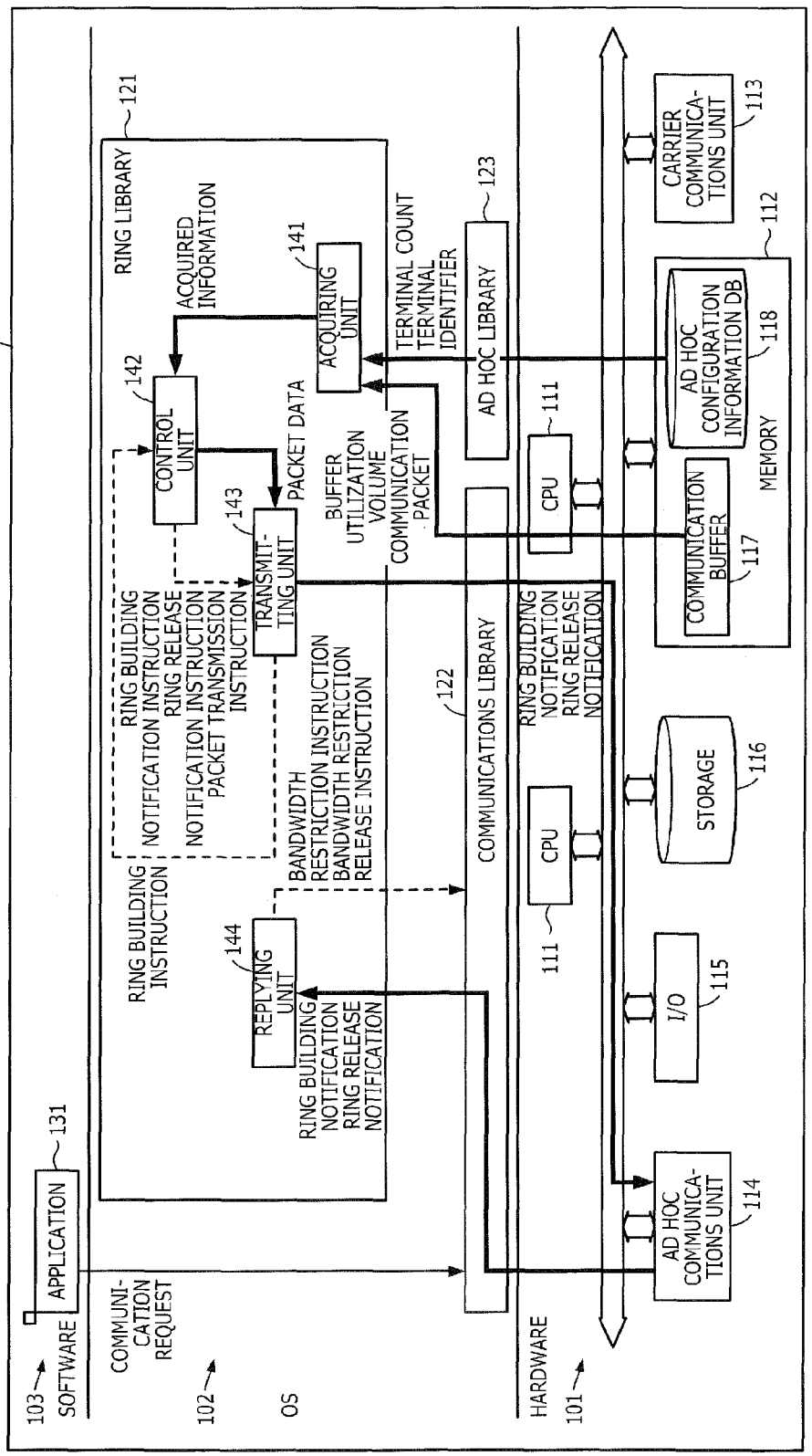
FIG. 1 is a block diagram of a terminal apparatus included in a data communication system according to an embodiment.

Embodiments of a data communication method and a data communication system will be explained in detail with reference to the accompanying drawings. FIG. 1 is a block diagram of a terminal apparatus included in a data communication system according to an embodiment. A terminal apparatus 100 depicted in FIG. 1 is an example of a configuration using a mobile telephone, and includes hardware 101, an operating system (OS) 102, and software 103.

The hardware 101 includes a CPU 111, memory 112, a carrier communications unit 113, an ad hoc communications unit 114, an I/O 115, and storage 116. The OS 102 includes a ring library 121, a communications library 122, and an ad hoc library 123. The software 103 includes an application 131 that performs a communication process.

The CPU 111 controls overall processes of the terminal apparatus 100 and executes programs (the ring library 121, the communications library 122, and the ad hoc library 123) of the OS 102 and the application 131 of the software 103. As depicted, the terminal apparatus 100 may be equipped with the CPU 111 in plural and configured to perform parallel processing.

The memory 112 is accessed by the CPU 111 during execution, and includes a communication buffer 117 and an area of an ad hoc configuration information database (DB) 118. The carrier communications unit 113 performs communication with a base station (not depicted). The ad hoc communications unit 114 performs ad hoc communication with other terminal apparatuses 100. The I/O 115 is an interface for the input and output of data with respect to the terminal apparatus 100. The storage 116 is a recording medium such as flash memory.

The ring library 121 operates in cooperation with the ring libraries of other terminal apparatuses 100 and is a program that controls the building of rings using the terminal apparatuses 100. Ring building is performed to suppress the overflow of the communication buffer 117 when the volume used of the communication buffer 117 has increased. Consequent to the building of a ring, the packet data of the communication buffer 117 of a given terminal apparatus 100 is transmitted to another terminal apparatus 100 that is directly connected to the given terminal apparatus 100, via ad hoc communication. The term "ring" is used for ease of understanding that as described above, a portion of the packet data received by the given terminal apparatus 100 returns to the terminal apparatus 100 that transmitted the packet data.

The ring library 121 includes an acquiring unit 141, a control unit 142, a transmitting unit 143, and a replying unit 144. The ring library 121 is a program that is executed immediately before the OS 102 processes packets that have accumulated in the communication buffer 117. After operation of the ring library 121 has ended, normal packet processing is again executed.

The acquiring unit 141 uses the communications library 122, and acquires the buffer utilization volume from the communication buffer 117 and the communication packets in the communication buffer 117. The acquiring unit 141 uses the ad hoc library 123, and acquires from the ad hoc configuration information DB 118, the terminal count and terminal identifiers of the terminal apparatuses involved in the ad hoc communication. The acquiring unit 141 outputs the acquired information to the control unit 142. If the acquired buffer utilization volume of the communication buffer 117 exceeds a threshold, the acquiring unit 141 notifies the control unit 142 that the buffer utilization volume exceeds the threshold. This threshold is a fixed value that is set based on the total capacity of the communication buffer 117 at the time of design of the terminal apparatus 100.

The control unit 142 builds or releases a ring, based on the utilization volume acquired by the acquiring unit 141, for the communication buffer 117. For example, among the multiple terminal apparatuses 100, when the terminal apparatus 100 whose distance to the base station is the shortest path becomes a base station connected terminal (first terminal apparatus) that communicates with the base station as a gateway, the utilization volume of the communication buffer 117 thereof increases.

Among the terminal apparatuses 100 directly establishing a communication ring with the terminal apparatus 100 of the control unit 142, the control unit 142 uses the terminal apparatuses 100 (second terminal apparatus) that are not the terminal apparatus 100 serving as the base station connected terminal and having the shortest path to the base station, to build or release the ring. Further, the base station connected terminal instructs the transmitting unit 143 to transmit to the other terminal apparatuses 100, ring building notification or ring release notification. If the buffer utilization volume acquired by the acquiring unit 141 for the communication buffer 117 is less than or equal to the threshold, release of the ring is determined.

After the ring has been built, to prevent overflow of the communication buffer 117 of the terminal apparatus 100 of the control unit 142, the control unit 142 removes packet data from the communication buffer 117, and instructs the transmitting unit 143 to remove from the communication buffer 117 and transmit to the other terminal apparatuses 100 that form the ring, packet data of a given volume (communication volume).

The transmitting unit 143, upon receiving an instruction from the control unit 142, uses the communications library 122, and transmits to the other terminal apparatuses 100, the instructed ring building notification or ring release notification. Further, while the ring is formed, the transmitting unit 143, based on the control of the control unit 142, removes packet data from the communication buffer 117 and transmits the packet data to the terminal apparatuses 100 forming the ring. Before transmitting the packet data, the transmitting unit 143 checks the ring for failures consequent to radio communication interruption, etc. and upon detecting failure, the transmitting unit 143 requests the control unit 142 to rebuild the ring.

The replying unit 144 receives ring building notification or ring release notification transmitted from the terminal apparatuses 100, and instructs the communications library 122 to restrict the bandwidth or release the restriction of the bandwidth of these terminal apparatuses 100. If ring building notification is received, the bandwidth for communication with the other terminal apparatuses 100 is fixed to the communication bandwidth at that point in time. If ring release notification is received, the restriction on the bandwidth is released.

The communications library 122 is a program that executes communication for the terminal apparatus 100. Based on a communication request from the application 131, the communications library 122 communicates with the base station, via the carrier communications unit 113. Further, when the terminal apparatus 100 of the communications library 122 becomes a ring terminal apparatus 100, the communications library 122 communicates with the base station connected terminal, via the ad hoc communications unit 114. When the terminal apparatus 100 of the communications library 122 becomes the base station connected terminal connected to the base station, the communications library 122 communicates with the base station, via the carrier communications unit 113, and communicates with the other terminal apparatuses 100, via the ad hoc communications unit 114.

The communications library 122, consequent to an instruction from the acquiring unit 141, acquires the buffer utilization volume from the communication buffer 117 and communication packets in the communication buffer 117. The communications library 122 sends to the replying unit 144, ring building notifications and ring release notifications received via the ad hoc communications unit 114, and according to a bandwidth restriction instruction or a bandwidth restriction release instruction output from the replying unit 144, restricts or releases a restriction of the communication bandwidth of the ad hoc communications unit 114, for communication with the other terminal apparatuses 100.

The ad hoc library 123 is a program that acquires from the ad hoc configuration information DB 118, information concerning the configuration of ad hoc communication, such as the terminal count and terminal identifiers.

Figure 2:
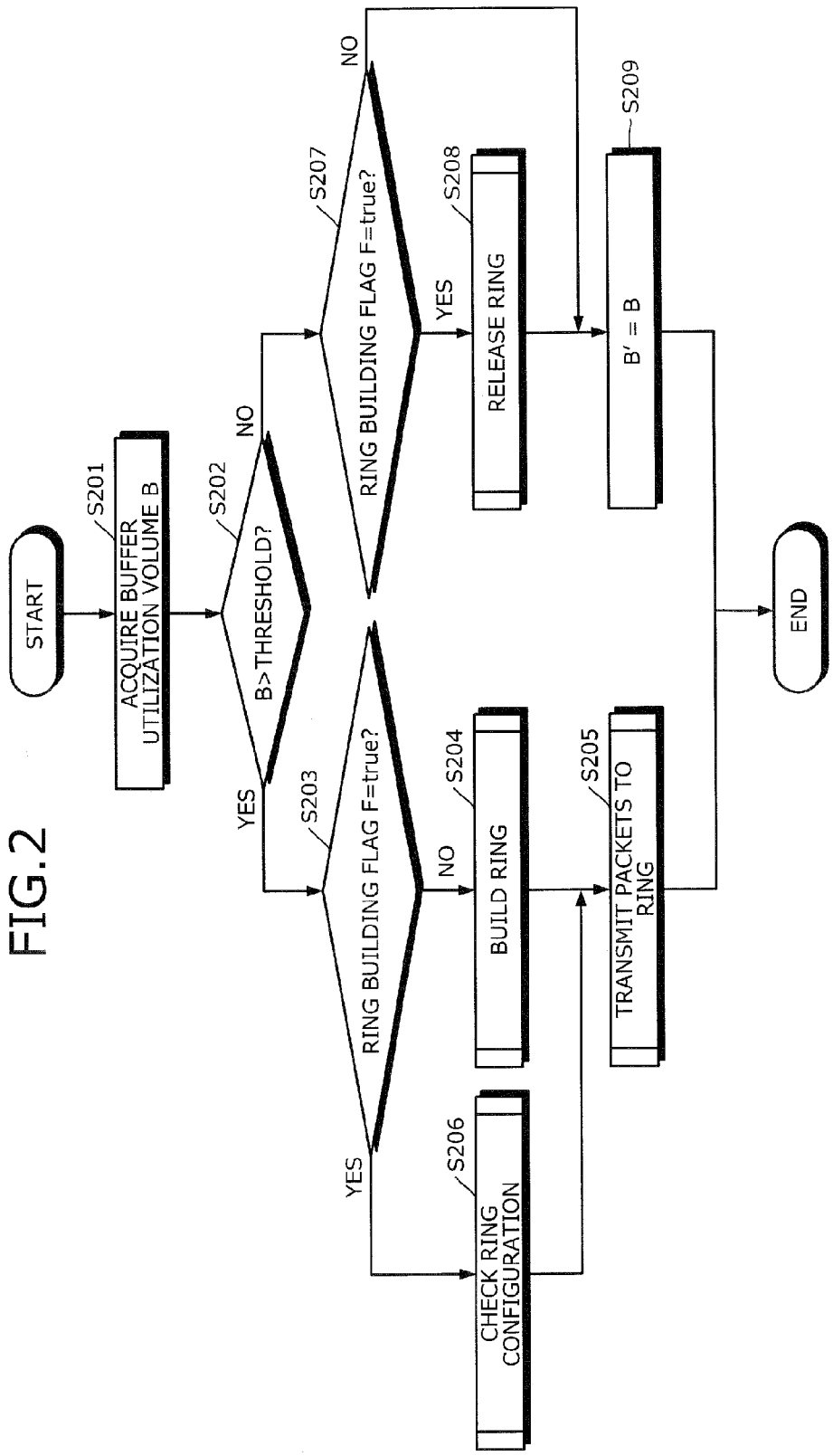
FIG. 2 is a flowchart of an overall process for ring building performed by a terminal apparatus.

A ring building process executed by the ring library 121 will be described. FIG. 2 is a flowchart of an overall process for ring building performed by a terminal apparatus. The process below is continually repeated by the control unit 142 of the ring library 121 of a given terminal apparatus 100 that realizes that the given terminal apparatus 100 is the base station connected terminal, and successively copes with changes in circumstances.

The control unit 142, via the communications library 122, acquires a buffer utilization volume B of the communication buffer 117 (step S201), and compares the buffer utilization volume B with a predetermined given threshold (step S202). For example, if the threshold is set to 80 percent of total capacity of the communication buffer 117 and the total capacity of the communication buffer 117 is 10 Mbytes, the threshold is 8 Mbytes.

Here, if the buffer utilization volume B exceeds the threshold (step S202: YES), since the given terminal apparatus 100 of the control unit 142 is the base station connected terminal, the control unit 142 determines that a ring has to be built among the terminal apparatuses 100. The control unit 142 detects a ring building state (step S203). For example, if a ring building flag F does not indicate "true" (ring building state) (F=false; ring release state) (step S203: NO), the control unit 142 builds a ring (step S204), transmits to the built ring, packets of the given terminal apparatus 100 (step S205), and ends the process. On the other hand, at step S203, if the ring building flag F indicates "true" (step S203: YES), the control unit 142 checks the built ring configuration (step S206), and performs the packet transmission at step S205.

At step S202, if the buffer utilization volume B is less than or equal to the threshold (step S202: NO), the built ring is released. For example, if the ring building flag F indicates "true" (ring building state) (step S207: YES), the control unit 142 releases the ring (step S208), converts the buffer utilization volume B into a temporary variable B' (step S209), and ends the process. On the other hand, at step S207, if the ring building flag F does not indicate "true" (F=false; ring release state) (step S207: NO), the control unit 142 transitions to step S209.

Figure 3:
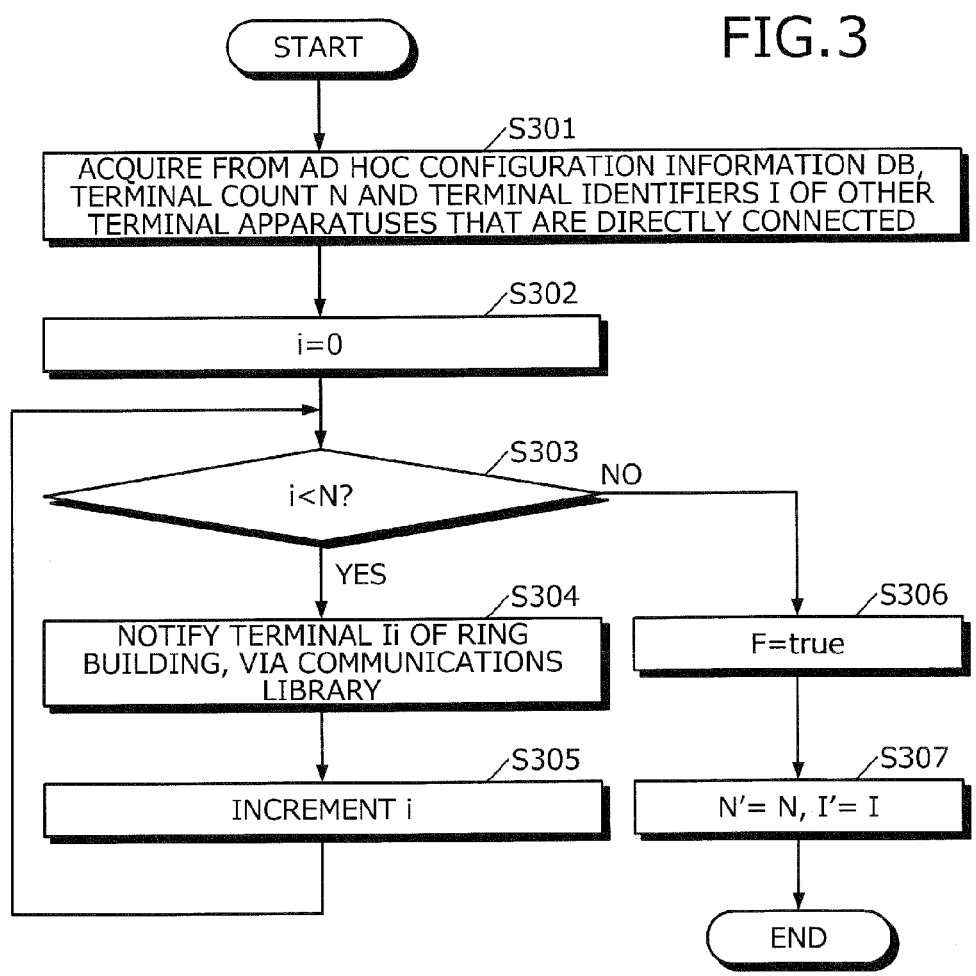
FIG. 3 is a flowchart of a ring building process performed by a terminal apparatus.

FIG. 3 is a flowchart of a ring building process performed by a terminal apparatus. The operation at step S204 in FIG. 2 will be described. When a ring is built, the control unit 142 acquires from the ad hoc configuration information DB 118, the terminal count N and the terminal identifiers I of the other terminal apparatuses 100 that are directly connected (step S301).

The control unit 142 initializes a terminal apparatus count i to 0 (step S302), and performs ring building with respect to the terminal apparatuses 100 of the terminal count N. The control unit 142 determines whether the terminal apparatus count i of the terminal apparatuses 100 forming the ring has reached the terminal count N (step S303), and if the terminal apparatus count i has not reached the terminal count N (step S303: YES), the control unit 142 notifies a terminal Ii of ring building, via the communications library 122 (step S304). The control unit 142 increments the terminal apparatus count i (step S305), and returns to step S303. By the operations at steps S303 to S305, terminal apparatuses 100 of the terminal count N are respectively notified of ring building.

On the other hand, at step S303, if the terminal apparatus count i has reached the terminal count N (step S303: NO), the control unit 142 changes the ring building flag F to indicate "true" (step S306), builds a ring by ad hoc communication of the terminal count N, converts the terminal count N into a temporary variable N', converts each of the terminal identifiers I into a temporary variable I' (step S307), and ends the process.

Figure 4:
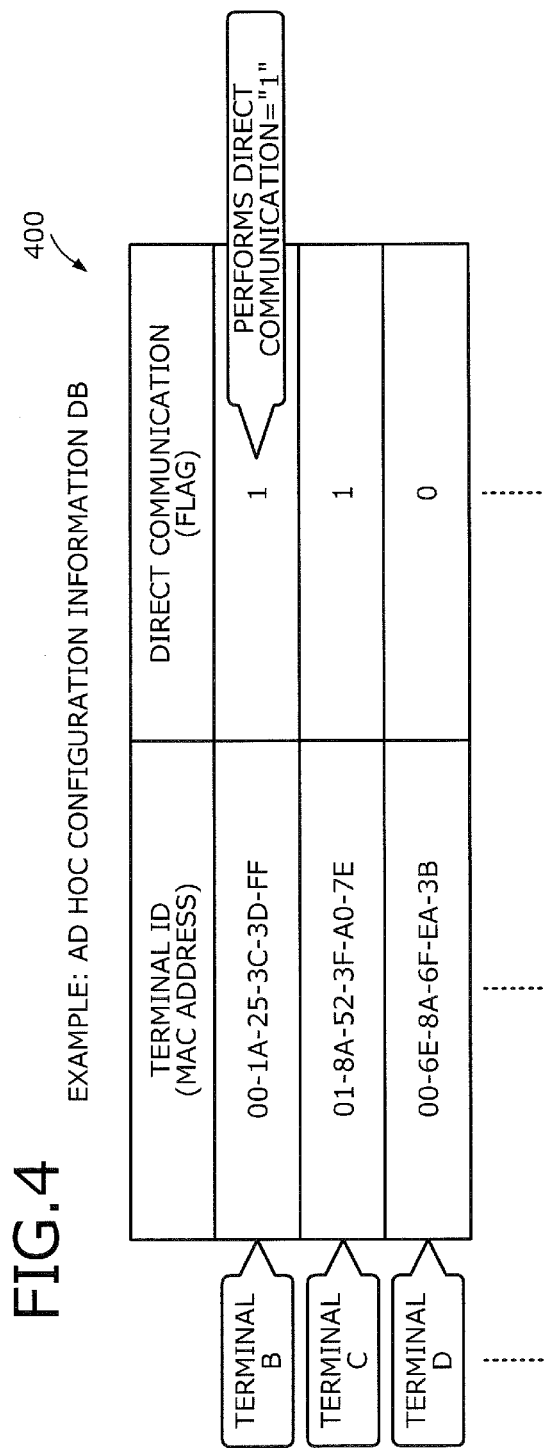
FIG. 4 is a diagram of ad hoc configuration information that is stored by a terminal apparatus.

FIG. 4 is a diagram of ad hoc configuration information that is stored by a terminal apparatus. FIG. 4 depicts an example of ad hoc configuration information 400 that is stored in the ad hoc configuration information DB 118. As depicted, the ad hoc configuration information DB 118 stores for each of the other terminal apparatuses 100 (terminals B and C, and D), a terminal ID (in the example depicted, MAC address) and a flag that indicates whether the terminal performs direct communication (terminals that perform direct communication by ring building=1, terminals that do not perform direct communication=0).

Figure 5:
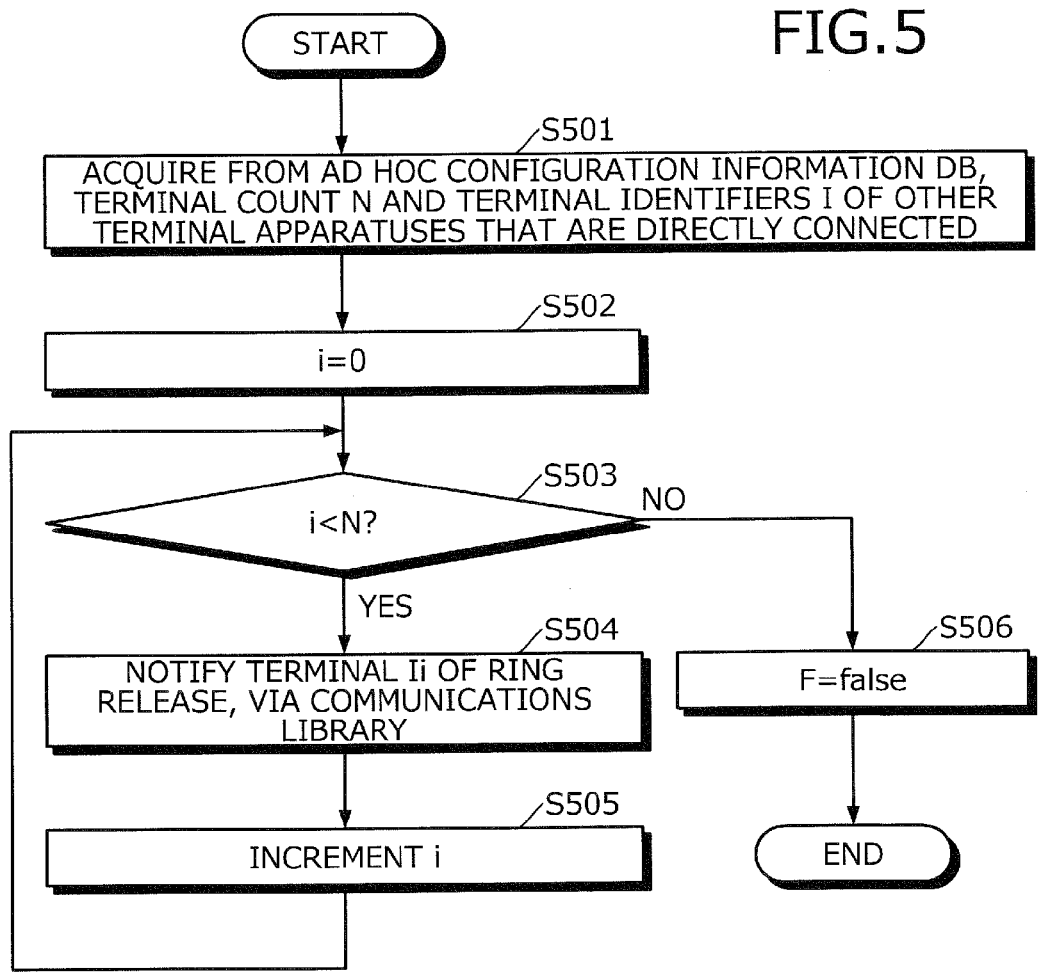
FIG. 5 is a flowchart of a ring release process performed by a terminal apparatus.

FIG. 5 is a flowchart of a ring release process performed by a terminal apparatus. Operations at step S208 in FIG. 2 will be described. When the ring is released, the control unit 142 acquires from the ad hoc configuration information DB 118, the terminal count N and the terminal identifiers I of the other terminal apparatuses 100 that are directly connected (step S501).

The control unit 142 initializes the terminal apparatus count i to 0 (step S502), and performs ring release with respect to the terminal apparatuses 100 of the terminal count N. The control unit 142 determines whether the terminal apparatus count i of the terminal apparatuses 100 releasing the ring has reached the terminal count N (step S503), and if the terminal apparatus count i has not reached the terminal count N (step S503: YES), the control unit 142 notifies a terminal Ii of ring release, via the communications library 122 (step S504). The control unit 142 increments the terminal apparatus count i (step S505), and returns to step S503. By the operations at steps S503 to S505, terminal apparatuses 100 of the terminal count N are respectively notified of ring release.

On the other hand, at step S503, if the terminal apparatus count i has reached the terminal count N (step S503: NO), the control unit 142 changes the ring building flag F to indicate "false" (step S506), and ends the process.

Figure 6:
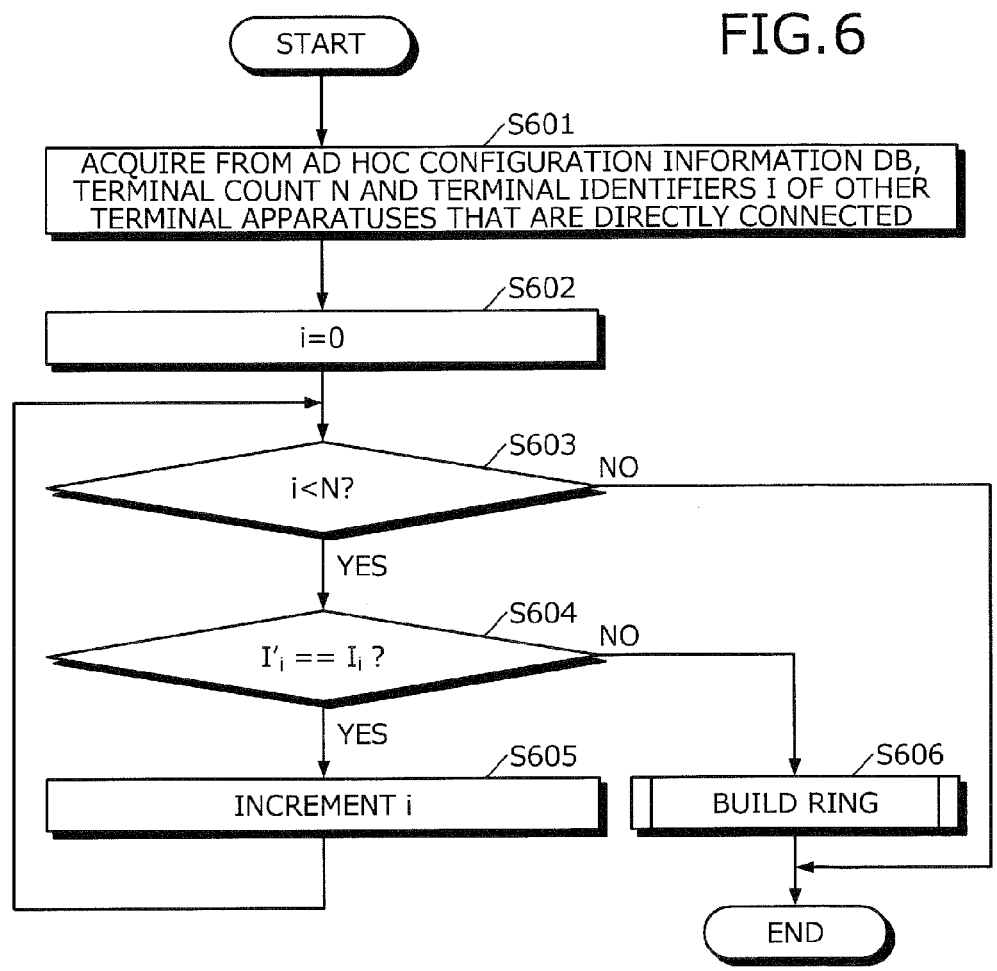
FIG. 6 is a flowchart of a ring configuration check process performed by a terminal apparatus.

FIG. 6 is a flowchart of a ring configuration check process performed by a terminal apparatus. Operations at step S206 in FIG. 2 will be described. The ring configuration check process periodically checks ring configuration since over time, terminal apparatuses 100 may be lost from the built ring consequent to movement of the terminal apparatuses 100.

The control unit 142 acquires from the ad hoc configuration information DB 118, the terminal count N and the terminal identifiers I of the other terminal apparatuses 100 that are directly connected (step S601). The control unit 142 initializes the terminal apparatus count i to 0 (step S602), and determines whether the terminal apparatus count i of the terminal apparatuses 100 subject to the ring configuration check has reached the terminal count N (step S603). If the terminal apparatus count i has not reached the terminal count N (step S603: YES), the control unit 142 transitions to step S604, and if the terminal apparatus count i has reached the terminal count N (step S603: NO), the control unit 142 ends the process.

At step S604, the control unit 142 determines for each terminal apparatus 110, whether the terminal identifier I'i of the terminal apparatus 100 at the previous detection coincides with the current terminal identifier Ii (step S604), thereby enabling confirmation of whether formation of the ring is maintained by the same terminal apparatuses 100. At step S604, if the control unit 142 determines coincidence (step S604: YES), the control unit 142 increments the terminal apparatus count i (step S605), and returns to step S603. On the other hand, if the control unit 142 determines no coincidence (step S604: NO), a change among the terminal apparatuses 100 forming the ring has occurred and because rebuilding of the ring is necessary, the control unit 142 performs ring building (step S606), thereby ending the process. The ring building at step S606 is the same as the operation at step S204 in FIG. 2 and the process depicted in FIG. 3 is executed.

Figure 7:
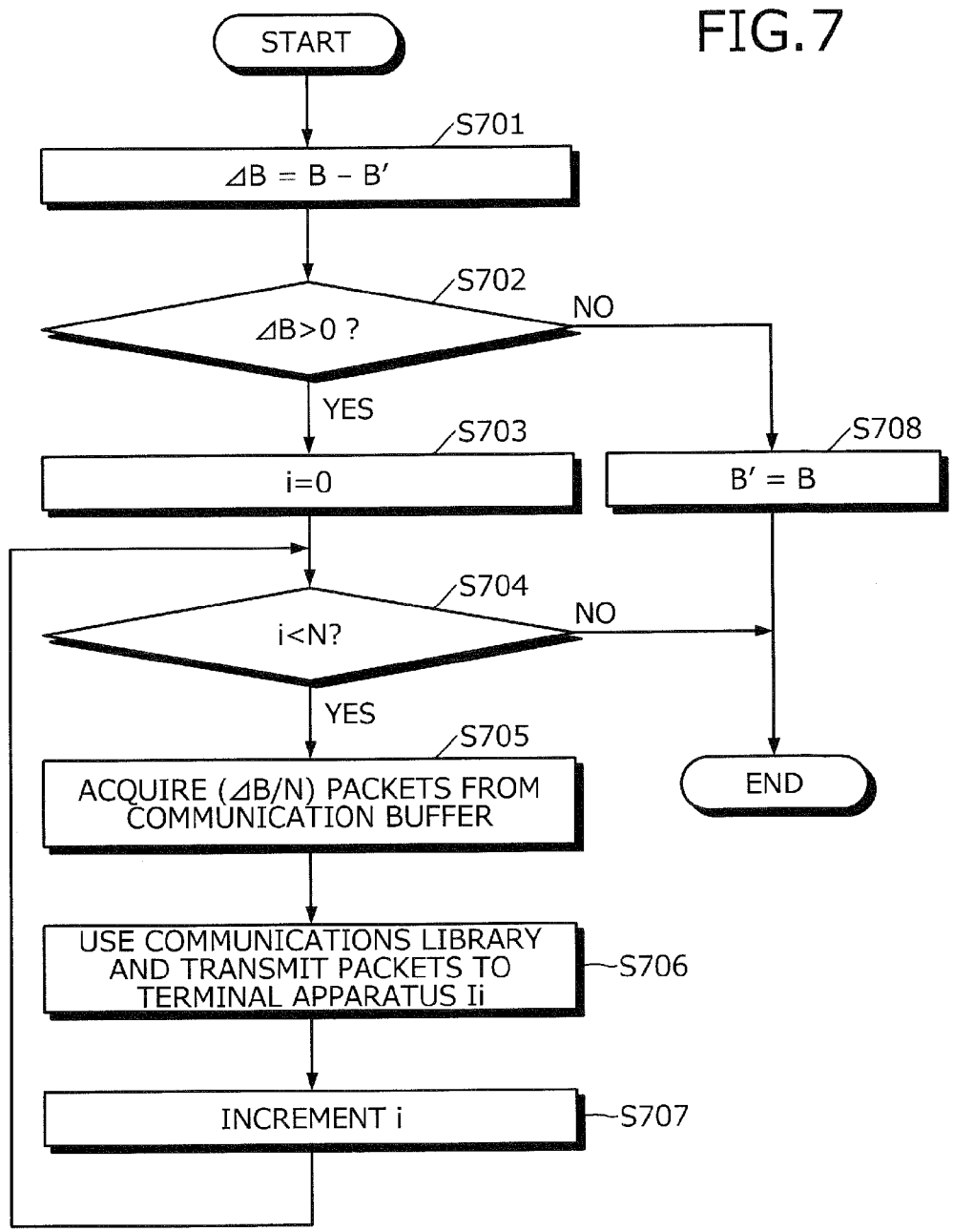
FIG. 7 is a flowchart of a process of packet transmission to the ring, performed by a terminal apparatus.

FIG. 7 is a flowchart of a process of packet transmission to the ring, performed by a terminal apparatus. Operations at step S205 in FIG. 2 will be described. The control unit 142 of the base station connected terminal obtains the increased amount of buffer use ΔB of the communication buffer 117, via the communications library (step S701). The increased amount of buffer use ΔB may be obtained by ΔB=B−B' (buffer utilization volume at the previous detection).

The control unit 142 determines whether the increased amount of buffer use ΔB has further increased or decreased (step S702). If the increased amount of buffer use ΔB has increased (ΔB>0) (step S702: YES), the control unit 142 initializes the terminal apparatus count i to 0 (step S703), and determines whether the terminal apparatus count i has reached the terminal count N of the other terminal apparatus 100 (step S704). If the terminal apparatus count i has not reached the terminal count N (step S704: YES), the control unit 142 acquires from the communication buffer 117, a given volume of packets (step S705). In the present example, the control unit 142 acquires from the communication buffer 117 (ΔB/N), i.e., a communication volume that is equal to the increased amount of buffer use ΔB divided by the terminal count N.

The control unit 142 uses the communications library 122 and transmits from the ad hoc communications unit 114 to a relevant terminal apparatus (Ii) 100, packets of the communication volume calculated at step S705 (step S706). The control unit 142 increments the terminal apparatus count i (step S707), returns to step S704, and similarly performs packet transmission with respect to communication apparatuses 100 of the terminal count N.

Meanwhile, at step S702, if the increased amount of buffer use ΔB has decreased (step S702: NO), the control unit 142 converts the buffer utilization volume B of the communication buffer 117 into a temporary variable B' (step S708), and ends the process. At step S704, if the terminal apparatus count i has reached the terminal count N (step S704: NO), the control unit 142 ends the process.

Figure 8:
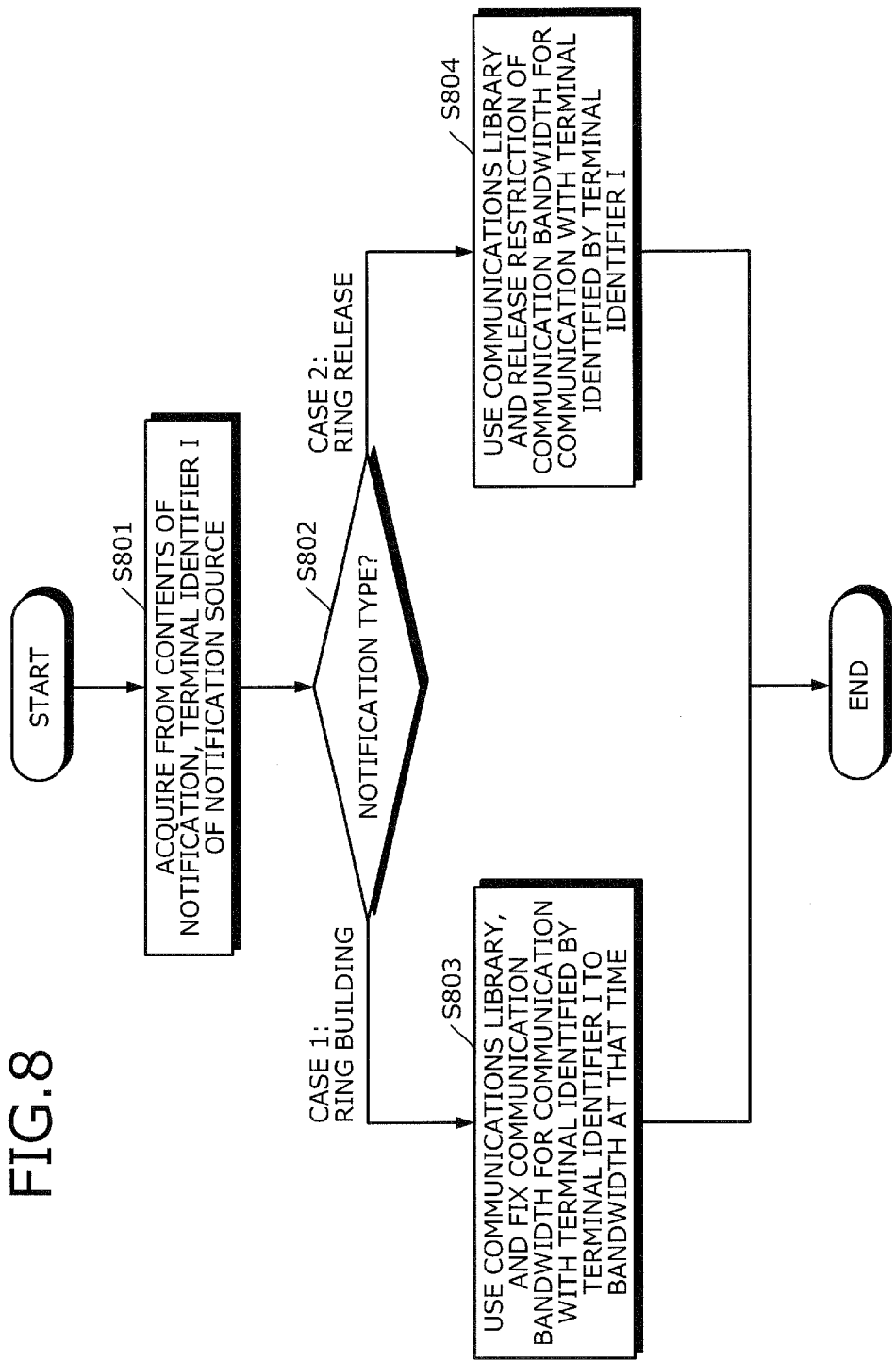
FIG. 8 is a flowchart of a process performed by a terminal apparatus that receives notification related to ring building.

FIG. 8 is a flowchart of a process performed by a terminal apparatus that receives notification related to ring building. A process performed by each terminal apparatus 100 that receives ring building and ring release notification from the base station connected terminal will be described.

A terminal apparatus 100 that has received notification acquires from the contents of the notification, the terminal identifier I of the base station connected terminal that is the source of the notification (step S801), and determines the type of the notification (step S802). If the notification is for ring building (step S802: Case 1), the terminal apparatus 100 uses the communications library 122, and fixes the communication bandwidth for communication with the base station connected terminal identified by the terminal identifier I, to the bandwidth at that time (step S803), and ends the process. On the other hand, if the notification at step S802 is for ring release (step S802: Case 2), the terminal apparatus 100 uses the communications library 122 and releases the restriction of the communication bandwidth for communication with the base station connected terminal identified by the terminal identifier I (step S804), and ends the process.

Figure 9:
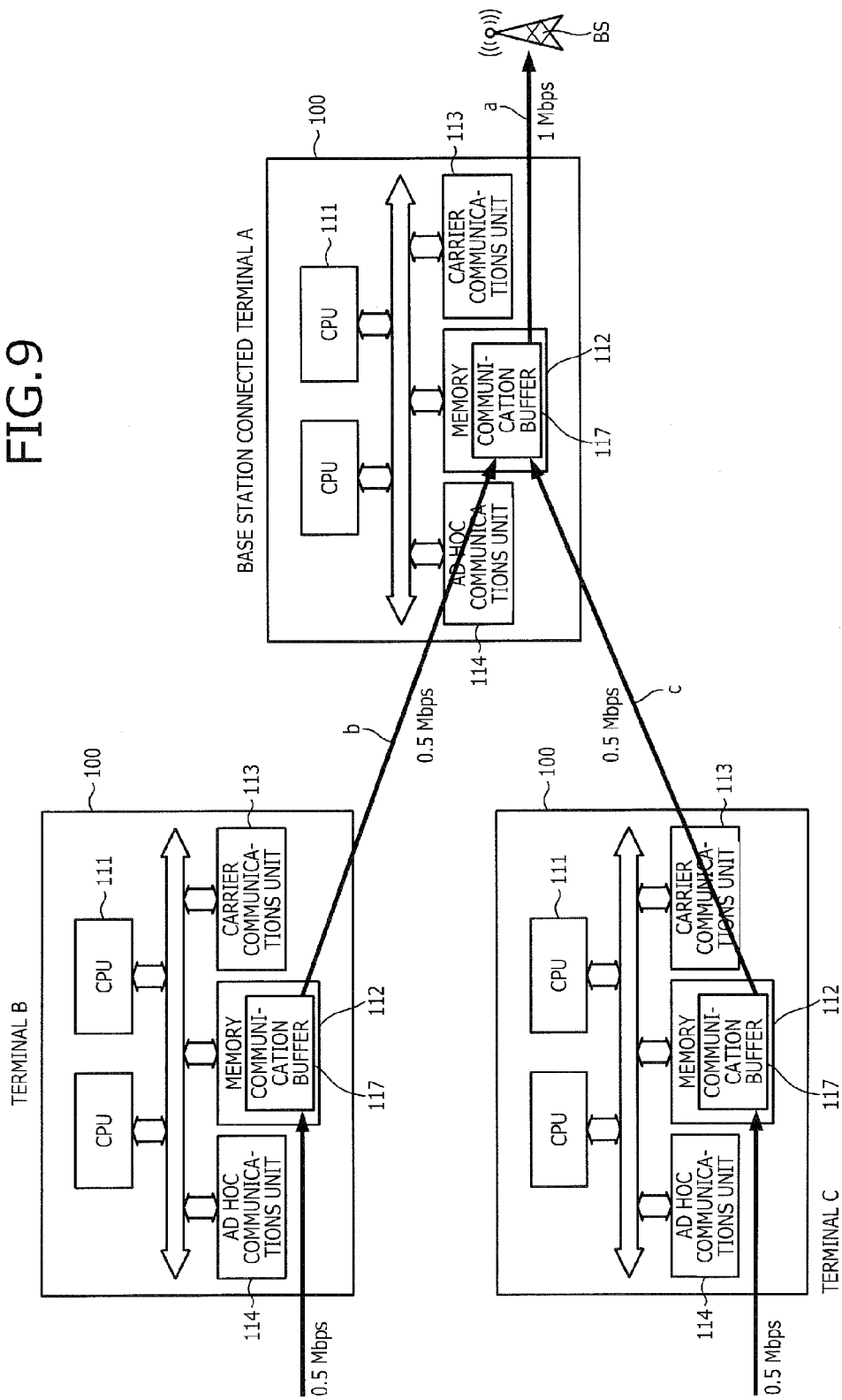
FIG. 9 is a diagram depicting normal data flow by ad hoc communication.

FIG. 9 is a diagram depicting normal data flow by ad hoc communication. A single terminal apparatus 100 is connected, as a base station connected terminal A (first terminal apparatus), to a base station BS via the carrier communications unit 113. The base station connected terminal A is connected by ad hoc communication to 2 other terminals B and C (second terminal apparatuses), via the ad hoc communications unit 114. The terminals B and C communicate with the base station BS, via the base station connected terminal A.

With the ad hoc communication described above, communication volumes b and c to be transmitted to the base station BS by the terminals B and C, via the base station connected terminal A, are 0.5 Mbps, respectively. In this case, at the base station connected terminal A, a total communication volume of the two terminals B and C of 1 Mbps is received, i.e., a communication volume a of 1 Mbps is transmitted to the base station BS. Under these conditions, the communication volume a that the base station connected terminal A transmits to the base station BS, corresponds to the communication volume b+c that is received from the terminals B and C. Accordingly, the communication buffer 117 of the base station connected terminal A is 10 Mbytes, having sufficient available capacity; and the packets from the terminals B and C are routed via the base station connected terminal A as quickly as possible.

Figure 10:
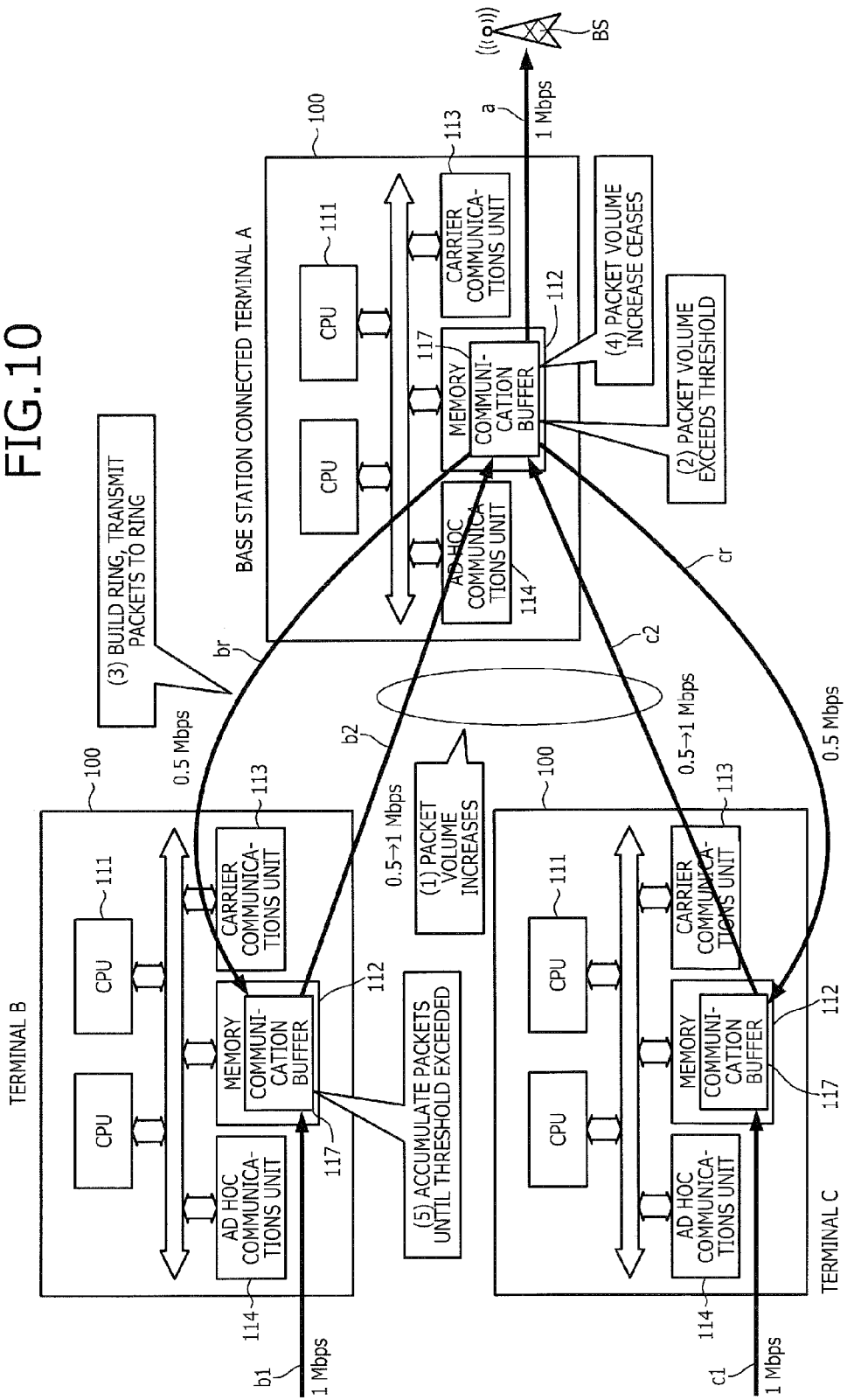
FIG. 10 is a diagram depicting data flow by ad hoc communication when communication load concentrates.

FIG. 10 is a diagram depicting data flow by ad hoc communication when communication load concentrates. A state will be described where the communication volume at the base station connected terminal A increases from the state depicted in FIG. 9.

(1) Communication volumes b1 and c1 received by the terminals B and C are assumed to increase to 1 Mbps, respectively and the communication volumes b2 and c2 transmitted to the base station connected terminal A by the terminals B and C are assumed to become 1 Mbps, respectively. At the base station connected terminal A, a total communication volume of 2 Mbps is received from the two terminals B and C. However, the communication volume a that the base station connected terminal A transmits to the base station BS does not change and remains 1 Mbps.

(2) As a result, packets accumulate in the communication buffer 117 of the base station connected terminal A and exceed the threshold. For example, assuming that the capacity of the communication buffer 117 of the base station connected terminal A is 10 Mbytes and the threshold is 8 Mbytes, then at the base station connected terminal A, compared to the communication volume of 2 Mbps received from the terminals B and C, the communication volume transmitted to the base station BS is 1 Mbps and therefore, the rate at which packets accumulate in the communication buffer 117 is 1 Mbps. In this state, the communication buffer 117 of the base station connected terminal A, at the latest, will exceed the threshold in 8 MBytes×8/1 Mbps=64 seconds.

(3) In such a case of communication load concentration, when the threshold is exceeded, the base station connected terminal A transmits ring building notification to the terminals B and C, establishing ad hoc communication. The base station connected terminal A transmits packets to the terminals B and C at a rate obtained by dividing the rate at which packets accumulate in the communication buffer 117 by the two terminals B and C (refer to FIG. 7). Here, the terminals B and C restrict the communication bandwidth for communication with the base station connected terminal A. In the example depicted in FIG. 10, since communication is performed by a bandwidth of 1 Mbps at the point in time when the ring building notification is received, the terminals B and C restrict the communication volumes b and c to 1 Mbps, respectively, even after the ring building notification is received.

The base station connected terminal A transmits packets to the terminals B and C in communication volumes br and cr of 0.5 Mbps, respectively, by the ring formed by the terminals B and C. These communication volumes are the rate obtained by dividing the rate (1 Mbps) at which packets accumulate in the communication buffer 117 by the two terminals B and C.

(4) Thus, the communication volume a that is transmitted to the base station BS is equivalent to the communication volume b+c received by the base station connected terminal A and therefore, the packet increase in the communication buffer 117 of the base station connected terminal A ceases. In this manner, while the ring is formed by terminals performing ad hoc communication, even if the communication volume that the base station connected terminal A is to transmit to the base station BS increases, according to the increase, the communication volume transmitted to the terminals B and C in the ring is increased. As a result, the communication volume that accumulates in the communication buffer 117 of the base station connected terminal A does not increase, thereby suppressing buffer overflow. Here, the communication volume that the base station connected terminal A receives from the terminals B and C is limited by the communication bandwidth restriction and therefore, does not change unless the packets to be transmitted run out in the buffer of the terminal B or C.

(5) Since the terminals B and C receive packets from the base station connected terminal A, the communication volume increases. However, the communication bandwidth for communication with the base station connected terminal A is restricted and therefore, packets accumulate in the communication buffers 117 of the terminals B and C. For example, in FIG. 10, the terminals B and C respectively receive packets at a rate of 1+0.5=1.5 Mbps. Meanwhile, the terminals B and C transmit packets to the base station connected terminal A at a rate of 1 Mbps.

As a result, packets accumulate in the communication buffer 117 at a rate of 0.5 Mbps, which is the difference. The terminals B and C respectively have thresholds and continue to accumulate packets in the communication buffer 117 until the thresholds are exceeded. If the threshold is exceeded, the terminals B and C also prevent buffer overflow by building a ring according to the operations described with reference to FIG. 10 above and can further use the communication buffers 117 of other terminals.

Figure 11:
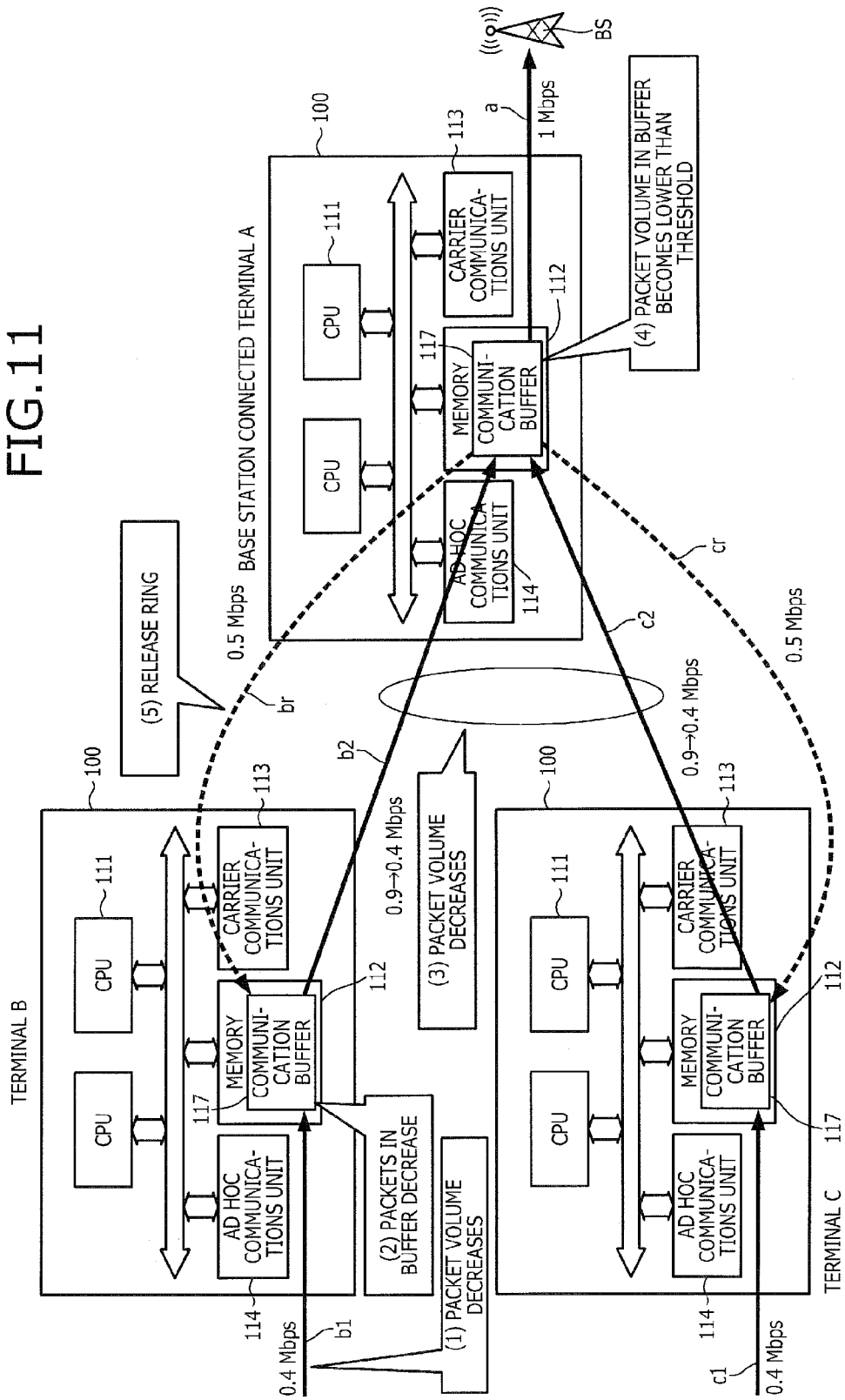
FIG. 11 is a diagram depicting data flow by ad hoc communication when communication load decreases.

FIG. 11 is a diagram depicting data flow by ad hoc communication when communication load decreases. A state will be described where the communication volume to the base station connected terminal A decreases from the state depicted in FIG. 10.

(1) The communication volumes b1 and c1 received by the terminals B and C are assumed to decrease to 0.4 Mbps, respectively. Further, in the state depicted in FIG. 10, the communication volumes br and cr of the packets received from the base station connected terminal A are assumed to be 0.5 Mbps, respectively, whereby the terminals B and C respectively receive packets of a communication volume of 0.9 Mbps.

(2) The communication volumes b2 and c2 that the terminals B and C transmit to the base station connected terminal A are limited by bandwidth restriction and therefore, remains at 1 Mbps, whereby the volume used of the communication buffers 117 of the terminals B and C gradually decreases.

(3) The terminals B and C decrease the communication volumes b2 and c2 of the packets transmitted to the base station connected terminal A, according to the decrease of packets in the communication buffer 117. For example, the terminals B and C set the communication volumes b2 and c2 to 0.9 Mbps, respectively.

(4) Consequently, the communication volume that the base station connected terminal A receives from the terminals B and C becomes 0.9 Mbps+0.9 Mbps=1.8 Mbps. On the other hand, the communication volume that the base station connected terminal A transmits to the terminals B and C is 1 Mbps+0.5 Mbps+0.5 Mbps=2 Mbps and therefore, the volume used in the communication buffer 117 of the base station connected terminal A begins to decrease and when the packet volume decreases a given amount or more, the packet volume becomes less than the threshold.

(5) Therefore, the base station connected terminal A transmits ring release notification to the terminals B and C, respectively, whereby the terminals B and C each release the communication bandwidth restrictions and the transmission from the base station connected terminal A to the terminals B and C ceases. Ultimately, as depicted in FIG. 11, the terminals B and C respectively transmit to the base station connected terminal A, packets at the communication volumes b2 and c2 of 0.4 Mbps. The base station connected terminal A receives packets at a total of 0.8 Mbps and transmits packets to the base station BS at the communication volume a of 1 Mbps, whereby the packet volume in the communication buffer 117 of the base station connected terminal A further decreases.

As depicted in FIG. 9, three terminal apparatuses 100 (the base station connected terminal A, and the terminals B and C) are assumed to be present and the respective communication buffers 117 thereof are each assumed to have a capacity of 10 Mbytes. Among the three terminal apparatuses 100, the base station connected terminal A alone can communicate with the base station BS; and the base station BS and the base station connected terminal A can communicate at a maximum rate of 1 Mbps. The base station connected terminal A and the terminal B, and the base station connected terminal A and the terminal C are assumed to be able to directly communicate by ad hoc communication; and to have a maximum communication bandwidth of 10 Mbps. Further, the terminals B and C are respectively assumed to execute an application that transmits communication packets at 1 Mbps.

In this case, the base station connected terminal A receives packets at 2 Mbps and transmits packets at 1 Mbps; and therefore, packets accumulate in the communication buffer at 1 Mbps. In this state (corresponding to conventional techniques, which have no countermeasure), in 10 MByte*8/1 Mbps=80 seconds, the communication buffer of the base station connected terminal A overflows, causing the overall performance of the network to drop.

In contrast, according to the configuration of the embodiment, if the thresholds of the terminal apparatuses 100 are set as 8 Mbytes, the communication buffer 117 of the base station connected terminal A reaches the threshold in 8 MByte*8/1 Mbps=64 seconds. At the point in time when the threshold is exceeded, a ring is built, whereby the increase of packets accumulating in the communication buffer 117 of the base station connected terminal A ceases and packets begin to accumulate in the communication buffers 117 of the terminals B and C. The terminals B and C respectively receive packets at 1 Mbps+0.5 Mbps=1.5 Mbps and transmit packets to the base station connected terminal A at 1 Mbps; and therefore, packets accumulate in the communication buffer 117 at 0.5 Mbps. Therefore, the threshold is reached in 8 MByte*8/0.5 Mbps=128 seconds.

Here, the terminals B and C do not perform communication other than with the base station connected terminal A and therefore, packets continue to accumulated in the communication buffer 117 and the buffer overflows in 2 MByte*8/0.5 Mbps=32 seconds. Thus, according to the embodiment, it takes 64+128+32=224 seconds for the communication buffer 117 to overflow in the network of the terminals A to C overall. In this manner, according to the embodiment, the period that it takes for a drop in the overall performance of the network to occur can be extended compared to conventional techniques, thereby enabling suppression of buffer overflow.

In the embodiment, although a terminal count of 3 was given, the terminal count is not limited hereto and may be increased; further, ad hoc communication is performed by these terminals and a ring can be built for a terminal whose buffer overflows. With the conventional techniques, even if the terminal count for ad hoc communication is increased, the period it takes for drops in overall network performance to occur does not change. In contrast, with the embodiment, since the communication buffer provided in each terminal can be used, as the terminal count increases, the buffer volume in the network overall increases, thereby enabling the period that it takes for drops in the overall performance of the network to occur to be extended.

Further, in the embodiment, the terminal apparatus 100 whose distance to the base station BS is the shortest path is the base station connected terminal A that communicates with the base station. Although increases in communication load and the suppression of overflow of the communication buffer 117 at the base station connected terminal A has been described, without limitation to the base station connected terminal A that connects to the base station BS, among the terminal apparatuses B and C that perform ad hoc communication, if the communication buffer 117 of one of the terminal apparatuses (B or C) is about to overflow, a ring can be build with other terminal apparatuses for the terminal apparatus (B or C), similarly enabling buffer overflow thereof to be suppressed.

In the embodiment, although an example has been described in which all of the terminal apparatuses 100 performing ad hoc communication are mobile telephones, a portion of the terminal apparatuses 100 may be portable devices such as PCs and PDAs, vehicular equipped terminal apparatuses, without limitation to mobile telephones.

The data communication method and the data communication system enable the communication load on each terminal to be decreased when multiple terminals are used to perform data communication.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A data communication method comprising:
   determining by a first terminal apparatus that is included among a plurality of terminal apparatuses capable of direct communication with one another, whether a communication volume of data received from a second terminal apparatus that is included among the terminal apparatuses exceeds a processable communication volume;
   building a network for sending the data to the second terminal apparatus when the communication volume of the data exceeds the processable communication volume;
   requesting, by the first terminal apparatus to the second terminal apparatus, data transmission when the communication volume of the data exceeds the processable communication volume;
   after the requesting, sending, by the first terminal apparatus to the second terminal apparatus, a portion of the data that exceeds the processable communication volume; and fixing, by the second terminal apparatus, a communication bandwidth to a bandwidth at a point in time when the data transmission is requested by the first terminal apparatus.

2. The data communication method according to claim 1, wherein
among the terminal apparatuses, a terminal apparatus connected to a base station becomes the first terminal apparatus, and
the data communication method further comprising communicating the data to the base station by the second terminal apparatus, via the first terminal apparatus.

3. The data communication method according to claim 1, wherein
the determining includes determining whether the communication volume of the data received from the second terminal apparatus is processable by using a utilization volume of a communication buffer.

4. The data communication method according to claim 1 and further comprising
canceling by the first terminal apparatus, data transmission to the second terminal apparatus, when the communication volume of the data received from the second terminal apparatus becomes the processable communication volume.

5. The data communication method according to claim 1, wherein
the sending includes transmitting to the second terminal apparatus, the data of a communication volume that is based on a count of the second terminal apparatuses.

6. A data communication method comprising:
determining by a first terminal apparatus that is included among a plurality of terminal apparatuses capable of direct communication with one another, whether a communication volume of data received from a second terminal apparatus that is included among the terminal apparatuses exceeds a processable communication volume;
building a network for sending the data to the second terminal apparatus when the communication volume of the data exceeds the processable communication volume; and
sending, by the first terminal apparatus to the second terminal apparatus, a portion of the data that exceeds the processable communication volume;
canceling by the first terminal apparatus, a data transmission request to the second terminal apparatus, when the communication volume of the data becomes the processable communication volume; and
releasing by the second terminal apparatus, a fixed bandwidth of a communication bandwidth, when the data transmission request from the first terminal apparatus is canceled.

7. A data communication system comprising:
a first terminal apparatus that is among a plurality of terminal apparatuses capable of direct communication with one another, wherein
the first terminal apparatus includes a communication buffer that has a predetermined capacity, and the first terminal apparatus is configured to:
determine whether a communication volume of data received from a second terminal apparatus that is included among the terminal apparatuses exceeds a processable communication volume;
build a network for sending the data to the second terminal apparatus when the communication volume of the data exceeds the processable communication volume;
send to the second terminal apparatus a portion of the data that exceeds the processable communication volume; and
determine based on a utilization volume of the communication buffer, whether the communication volume of the data received from the second terminal apparatus and a communication volume of the data to be transmitted to a base station are processable.

8. The data communication system according to claim 7, wherein
the first terminal apparatus includes:
a carrier communications unit that is configured to communicate with a base station; and
an ad hoc communications unit that is configured to perform direct communication with the second terminal apparatus.

9. The data communication system according to claim 8, wherein
the first terminal apparatus includes an ad hoc configuration information storage device that is configured to store information of the second terminal apparatus that performs ad hoc communication.

* * * * *